(12) United States Patent
Bass

(10) Patent No.: US 8,001,902 B2
(45) Date of Patent: Aug. 23, 2011

(54) SIGNAL TRANSMISSION SURVEILLANCE SYSTEM

(75) Inventor: Jamie Bass, Elnora, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 216 days.

(21) Appl. No.: 12/248,383

(22) Filed: Oct. 9, 2008

(65) Prior Publication Data

US 2010/0093270 A1    Apr. 15, 2010

(51) Int. Cl.
*F42B 4/00*    (2006.01)

(52) U.S. Cl. .......................... 102/387; 102/354

(58) Field of Classification Search .................... 102/387
See application file for complete search history.

(56) References Cited

U.S. PATENT DOCUMENTS

| | | | |
|---|---|---|---|
| 3,962,537 A | 6/1976 | Kearns et al. | |
| 4,267,562 A | 5/1981 | Raimondi | |
| 5,561,557 A | 10/1996 | Le Bris et al. | |
| 5,905,943 A | 5/1999 | Wiedeman et al. | |
| 6,056,237 A * | 5/2000 | Woodland | 244/3.15 |
| 6,125,260 A | 9/2000 | Wiedeman et al. | |
| 6,347,764 B1 | 2/2002 | Brandon et al. | |
| 6,764,041 B2 | 7/2004 | Oron | |
| 7,154,275 B2 | 12/2006 | Zank et al. | |
| 7,286,913 B2 * | 10/2007 | Bodin et al. | 701/11 |
| 7,349,544 B2 | 3/2008 | Tiwari | |
| D573,939 S * | 7/2008 | Las Heras | D12/319 |
| 7,472,866 B2 * | 1/2009 | Heaston et al. | 244/63 |
| D596,267 S * | 7/2009 | Colgren et al. | D12/319 |
| 7,679,037 B2 * | 3/2010 | Eden et al. | 244/3.1 |
| 2004/0196367 A1 | 10/2004 | Raymond et al. | |
| 2005/0051667 A1 | 3/2005 | Arlton et al. | |
| 2006/0283345 A1 | 12/2006 | Feldman et al. | |
| 2007/0200927 A1 | 8/2007 | Krenik | |
| 2008/0059452 A1 | 3/2008 | Frank | |

FOREIGN PATENT DOCUMENTS

| | | |
|---|---|---|
| WO | WO 2004/057263 | 7/2004 |
| WO | WO 2007/104152 | 9/2007 |

OTHER PUBLICATIONS

Aaron., K.M. et al., A Method for Balloon Trajectory Control, Global Aerospace Corp., Draft PSBI-0012, circa 2002.

* cited by examiner

*Primary Examiner* — Michael Carone
*Assistant Examiner* — Samir Abdosh
(74) *Attorney, Agent, or Firm* — Christopher A Monsey

(57) ABSTRACT

A system and method of detecting, processing, and selectively responding to radio frequency transmissions detected by at least one projectile deployed above a geographic area.

11 Claims, 8 Drawing Sheets

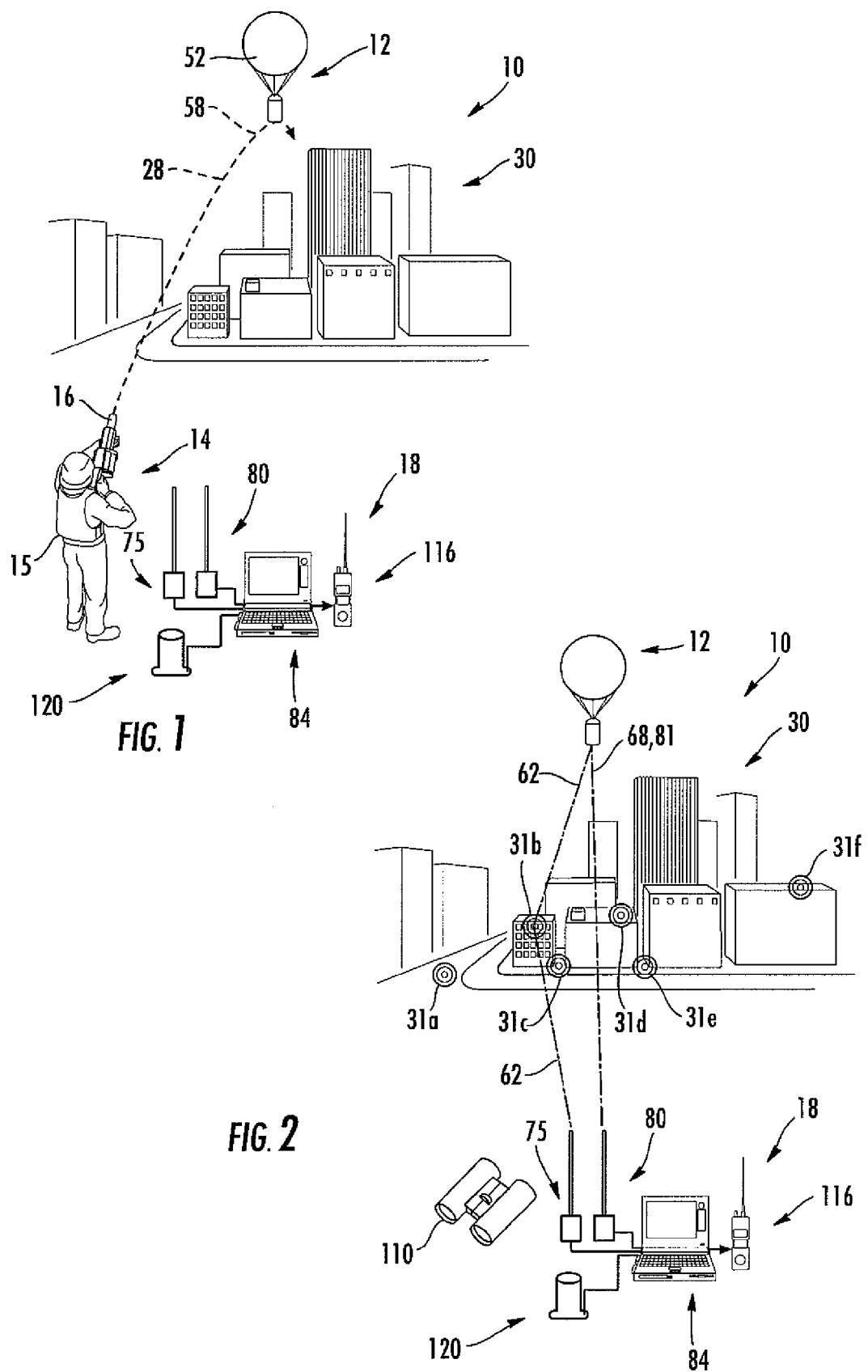

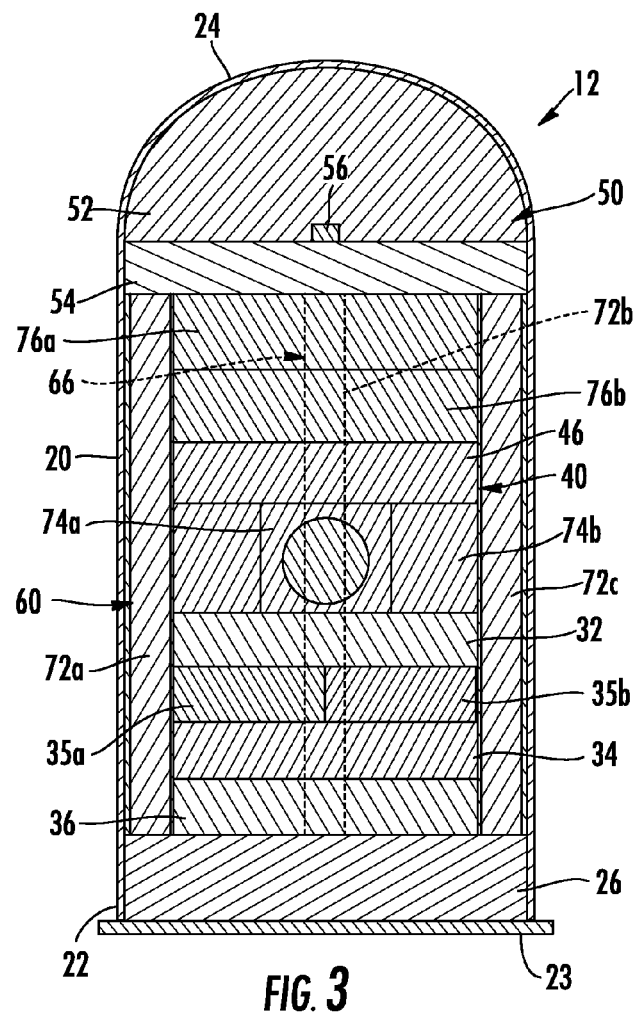
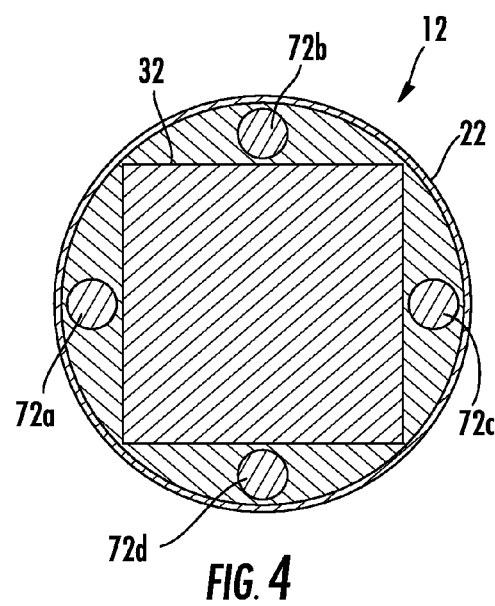

SIGNAL TRANSMISSION SURVEILLANCE SYSTEM

STATEMENT REGARDING FEDERALLY SPONSORED RESEARCH OR DEVELOPMENT

Government Interest. The invention described herein may be manufactured, used and licensed by or for the United States Government.

BACKGROUND OF THE INVENTION

The present invention relates generally to a signal transmission surveillance system and, more particularly, to such a system including an electronic projectile launched over a geographic area for detecting radio frequency transmissions therewithin.

Systems are known for producing radio frequency maps, for example, through the use of a constellation of communication satellites. Illustrative objectives of such systems include providing for more efficient communications by re-allocating user terminal radio frequency channels, eliminating the effects of undesirable signals from desirable user transmission signals, and reducing the power required by the user transmitter to effectively communicate. Such known satellite based systems illustratively use low Earth orbit satellites that communicate through one or more terrestrial gateways. As may be appreciated, these satellite based systems may have certain geo-spatial and time efficiency limitations depending upon the number and location of available satellites.

SUMMARY OF THE INVENTION

The present invention relates to a field deployable radio frequency surveillance system. More particularly, the system utilizes an electronic projectile launched from a hand-held launcher and configured to detect sources of radio frequency transmissions within a defined geographic area. Multiple electronic projectiles may be utilized to expand the desired geographic area of coverage.

According to an illustrative embodiment of the present disclosure, an apparatus for detecting signal transmissions includes an electronic projectile having a processor, a radio frequency detector operably coupled to the processor and configured to detect radio frequency transmission signals, and a transmitter operably coupled to the processor and configured to transmit a source signal including data about the detected radio frequency transmission signals. An operator station includes a receiver configured to receive the source signal, and a controller operably coupled to the receiver and configured to generate a radio frequency transmission map in response to the source signal. A display is operably coupled to the controller of the operator station and is configured to display the transmission map.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings.

FIG. 1 is a perspective view showing an illustrative radio frequency transmission surveillance system of the present disclosure, with the electronic projectile launched from a hand held launcher and the descent inhibitor deployed;

FIG. 2 is a perspective view similar to FIG. 1, showing a signal transmission detected by the electronic projectile, signals transmitted between the electronic projectile and the base station, and the location of the signal transmission determined by the base station;

FIG. 3 is a cross-sectional view in partial schematic of the electronic projectile of FIG. 1;

FIG. 4 is a transverse cross-sectional view of the electronic projectile of FIG. 3;

Figure 5:
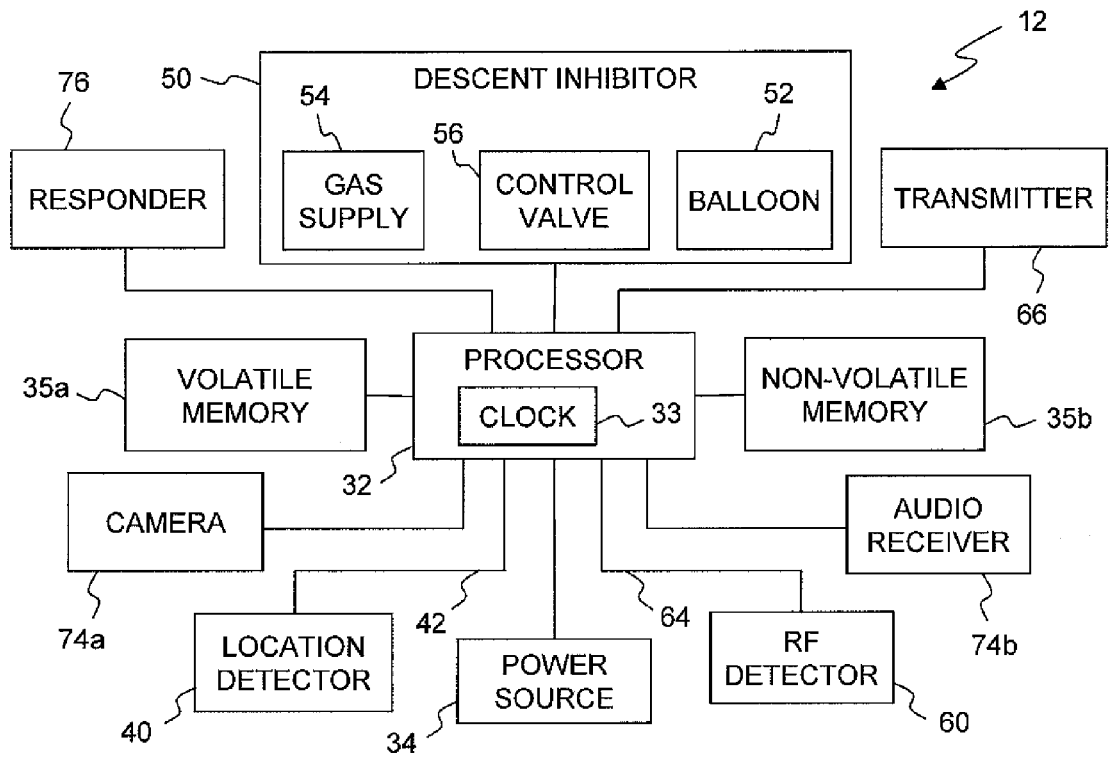
FIG. 5 is a block diagram showing the interaction of various illustrative elements with the processor of the electronic projectile of FIG. 1.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Referring initially to FIGS. 1 and 2, an illustrative embodiment radio frequency transmission surveillance system 10 is shown as including a deployable, illustratively an electronic projectile 12. The electronic projectile 12 is configured to be launched in the air from a conventional hand-held projectile launcher 14 operated by a user 15. As further detailed herein, a variety of different users 15, such as a soldier, a rescue worker, or a telecommunications technician, may operate the surveillance system 10 depending upon its particular application.

The electronic projectile 12 illustratively has a caliber defined between 20 mm and 100 mm, and typically about 40 mm. As such, the electronic projectile 12 may be used in conventional projectile launcher 14, such as the M203 grenade launcher or the MGL-140 multi-shot grenade launcher. More particularly, the projectile launcher 14 includes a launch tube 16 configured to receive and discharge the electronic projectile 12. While a handheld launcher 14 is shown in FIG. 1, other suitable launchers may also be used. For example, the launcher 14 may be ground supported. Alternatively, the user 15 may cause a balloon 52 (further detailed below) to deploy and inflate as the projectile 12 is positioned on, or at a certain predetermined elevation above (e.g., five feet), the ground. As further detailed herein, the electronic projectile 12 is in communication with a base or operator station 18, through a physical connection when in a docked mode of operation and through a wireless connection when in a deployed mode of operation.

With reference to FIGS. 3 and 4, the electronic projectile 12 illustratively includes a housing 20 including a cylindrical side wall 22 coupled to a base 23 and supporting a nose 24. A conventional propellant 26 is received within the housing 20 and is configured to drive the projectile 12 in motion. More particularly, the propellant 26 is configured to launch the electronic projectile 12 from the launch tube 16 of the projectile launcher 14 into a given trajectory 28 above a monitored area 30 (FIG. 1). When in this deployed mode of operation, the electronic projectile 12 is configured to detect RF signal sources 31 within the monitored area 30 (FIG. 2).

With reference to FIGS. 3 and 5, controller or processor 32 is received within the housing 20 and is operably coupled to a power source 34, such as a battery. The processor 32 illustratively includes an internal clock 33 (FIG. 5). A volatile or temporary memory (RAM) 35a is in communication with the processor 32 for storing mission sensitive information. As a security precaution, should the power source 34 fail, information stored within the volatile memory 35a will be lost and, as such, may not be retrieved. The volatile memory 35a illustratively includes projectile configuration details, such as desired surveillance modes (e.g., RF, video, audio, etc.), frequency surveillance details (e.g., bands for detection), and security protocols (e.g., encryption data and digital certificate data), which may be uploaded from the operator station 18, as further detailed herein. A non-volatile or permanent memory 35b may also be in communication with the processor 32 for storing non-sensitive information. The non-volatile memory 35b may be preprogrammed with basic operating and communications software.

A shock absorber 36 is illustratively received within the housing 20 for protecting internal components, particularly electronics such as the processor 32, from potentially damaging forces during launch and operation of the projectile 12. The shock absorber 36 may comprise any conventional resilient device for absorbing forces, such as a steel coil spring, a gas shock absorber, or an elastomeric disc.

A location detector 40 is operably coupled to the processor 32 and is configured to detect the location of the projectile 12 and provide a location signal 42 indicative thereof to the processor 32. In one illustrative embodiment, the location detector 40 comprises a global positioning system (GPS) receiver including an associated antenna 46. It should be noted that in the illustrative embodiment, the GPS receiver may be part of the processor 32 or a separate component coupled thereto. As is known, the GPS receiver, through its antenna 46, receives signals sent by a constellation of GPS satellites (not shown) orbiting the earth. Each satellite continually transmits signals including the time the signal was sent and the orbit for the satellite transmitting the signal. The processor 32 uses the arrival time of each signal to calculate the distance to each satellite, from which it determines the position of the electronic projectile 12. More particularly, the processor 32 may determine x, y, and z coordinates (corresponding to latitude, longitude and altitude) of the electronic projectile 12 from the signals received by the location detector 40.

The electronic projectile 12 further includes a descent inhibitor 50 operably coupled to the processor 32. The descent inhibitor 50 is stored within the nose 24 of the housing 20 during a stored mode of operation and is deployed outside of the housing 20 during a surveillance mode of operation. The processor 32 illustratively controls deployment of the descent inhibitor 50. In one illustrative embodiment, the descent inhibitor 50 comprises a balloon 52 in selective fluid communication with a gas supply 54, illustratively a container containing lighter than air gas, such as helium or hydrogen. The processor 32 is operably coupled to a control valve 56 positioned intermediate the gas supply 54 and the balloon 52. More particularly, the processor 32 is configured to open the control valve 56 for filling the balloon 52 from the gas supply 54. In a further illustrative embodiment, the descent inhibitor 50 comprises a parachute (not shown) deployed by an explosive charge. In both illustrative embodiments, the descent inhibitor 50 opposes the force of gravity, thereby causing the electronic projectile 12 to hover or float above the monitored area 30 for an extended period of time (FIG. 1).

In one illustrative embodiment, the processor 32 causes the descent inhibitor 50 to deploy when the projectile 12 has reached the maximum elevation or apex 58 of its trajectory 28. Such maximum elevation 58 may be determined by the processor 32 in response to signals received by the location detector 40. As detailed above, altitude is one of the coordinates (z coordinate) detected by the GPS receiver 44. Alternatively, a separate altimeter (not shown) may be operably coupled to the processor 32 for detecting the maximum height of the electronic projectile 12.

In certain illustrative embodiments, the electronic projectile may also include a trajectory control system (TCS). In one illustrative embodiment, the TCS is defined by the control valve 56 controlled by the processor 32. More particularly, the control valve 56 may be a three position valve with a first position providing fluid communication between the gas supply 54 and the balloon 52 (i.e., supply position), a second position providing fluid communication between the balloon 52 and atmosphere (i.e., venting position), and a third position preventing fluid flow to and from the balloon 52 (i.e., closed position). For example, the control valve 56 may be placed in the venting position in response to a command signal received from the operator station 18 to allow the projectile to descend to the ground for retrieval. Additionally, the control valve 56 may be placed in the supply position by the processor 32 in order to release more gas into the balloon over time as gas particles escape through the pores of the balloon material over time in order to maintain a desired altitude over the observation area.

In another illustrative embodiment, the TCS may comprise a tether defined by spool of high tensile strength material (wire or plastic line) attached to the projectile housing 20 as it is launched from the launcher 14. As the projectile 12 moves away from the launcher 14, the wire will unravel from the spool thereby allowing the projectile 12 to reach a desired elevation without restriction. After the descent inhibitor 50 deploys, the user may secure the tether to the ground with an anchor or stake. The tether prevents the projectile 12 from floating out of the desired geographic area.

In yet another illustrative embodiment, the TCS may comprise a lift-generating device, such as a wing, suspended on a tether from the balloon 52. More particularly, the wing generates a horizontal lift force that can be directed over a wide range of angles. This force, as transmitted to the balloon 52 by the tether, alters the balloon's path. An example of such a TCS is the StratoSail® System detailed by Global Aerospace Corporation of Altadena, Calif.

A surveillance device, illustratively a radio frequency (RF) detector 60 including an antenna 72a is operably coupled to the processor 32 and is configured to detect signals 62 transmitted by RF signal transmission sources 31 (FIG. 6), including frequency and signal identification data. In different illustrative embodiments, the RF detector 60 may be part of the processor 32 or a separate component coupled thereto. The RF detector 60 provides detection signals 64 indicative of the detected signals 62 from radio frequency signal transmission sources 31 to the processor 32. The detector 60 may include a tunable band filter (not shown) controlled by the processor 32 for detecting a variety of different RF bands. In a further illustrative embodiment, a band converter (not shown) may be used to convert the detected signal band frequency for subsequent signal processing and/or transmission.

Illustratively, the processor 32 cooperates with the internal clock 33 to timestamp the detected radio signal 62. In other words, the processor 32 records the time the signal 62 was detected. The processor 32 may also cooperate with the internal clock 33 to record the duration of transmission of the signal 62.

In one illustrative embodiment, the processor 32 is configured to detect the identification of the source 31 transmitting an RF signal 62. For example, in the case of a cellular phone, the processor 32 is configured to detect the ESID (Electronic Security Identification), sometimes referred to as an ESN (electronic serial number), which is embedded within the phone by the manufacturer. As is known, each time a call is placed, the phone's identification is transmitted to a base station so that the wireless carrier can check the call's validity. In certain instances, the processor 32 will transmit a signal to query cellular phones 31 within the monitored area 30 thereby causing the cellular phones 31 to transmit their respective identifications (ESIDs or ESNs).

Figure 6:
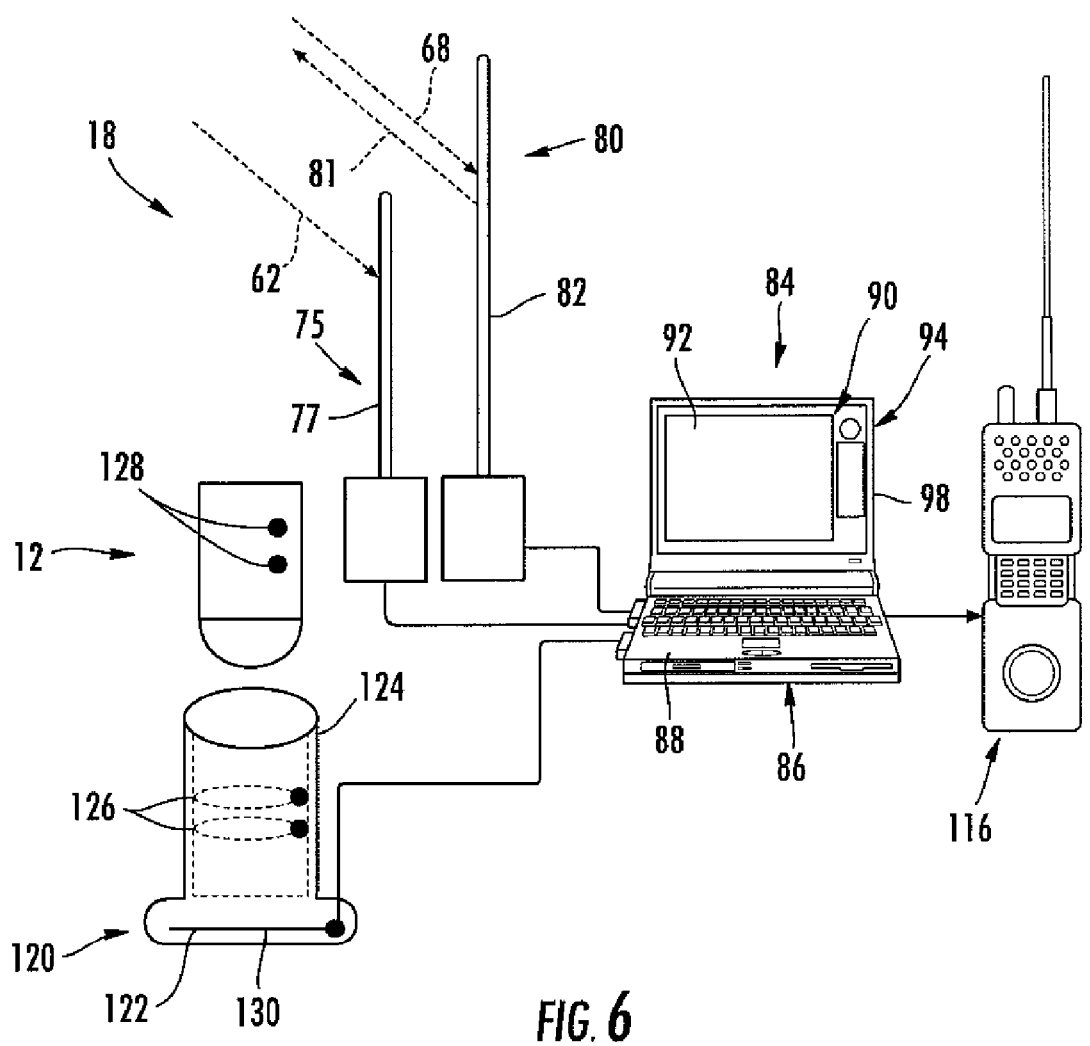
FIG. 6 is a perspective view in partial schematic of the base station of the surveillance system of FIG. 1.

A transmitter, illustratively a transceiver 66 including an antenna 72b is operably coupled to the processor 32. The processor 32 is configured to cause the transceiver 66 to send an RF source signal 68 to the operator station 18 (FIG. 6). The source signal 68 includes information or data from the location signal 42 and the detection signal 64. More particularly, the source signal 68 includes information or data on the location of the electronic projectile 12 and on the detected RF transmission signal sources 31. In other words, the transceiver 66 sends RF source signal 68 to the operator station 18 with the information recently collected by the projectile 12 (including, for example, signal timestamp, signal duration, signal frequency, and signal thumbprint, and location of projectile housing 20 (e.g., GPS coordinates)).

The source signal 68 is illustratively encrypted through software within volatile memory 35a as described above. More particularly, the source signal 68 may be encrypted in accordance with Advanced Encryption Standard FIPS 140-2 in order to provide for integrity and confidentiality. Filtering, illustratively OSI Layer 2, may also be used to allow only authorized nodes (i.e., receivers and/or transmitters) to communicate with the electronic projectile 12. Digital certificates may be stored within volatile memory 35a and embedded within the source signals 68 to ensure signal authenticity upon receipt by the operator station 18.

With further reference to FIGS. 3 and 4, a plurality of antennas 72 extend axially within the housing 20 of the electronic projectile 12. Illustratively, four antennas 72a, 72b, 72c, and 72d are shown, although the number and orientation of the antennas may vary based upon the particular applications of the electronic projectile 12. As noted above, antenna 72a may be operably coupled to the RF detector 60 to receive RF signals within a desired band. For example, the antenna 72a and associated detector 60 may be configured to detect cellular phone signals, typically transmitted within the 1800 MHz and 1900 MHz frequency bands. Further illustratively, antenna 72b may be operably coupled to the transceiver 66 to send and receive signals from the operator station 18. The remaining antennas 72c and 72d may be utilized for other application specific requirements. For example, antenna 72c may be used to receive RF transmission signals within the citizens band (CB), illustratively between 26.96 MHz and 27.41 MHz, while antenna 72d may be used to receive other RF transmission signals, such as those used by two-way radios (or walkie-talkies) or other commercial bands. In one illustrative embodiment, antenna 72d may be used for receiving and/or transmitting RF commercial transmissions on 2.4 GHz and/or 5.8 GHz bands. Antenna 72d, or additional antennae, may also be used to receive and/or transmit additional cellular phone transmissions on 800 MHz and/or 900 MHz bands. Alternatively, antenna may be used to jam or interfere with frequencies or send corrupted data to interrupt or jam signals from a specific frequency, as further detailed herein. A summary of illustrative uses of the antennas 72 are provided in the following table:

| ANTENNA | COUPLING | FUNCTION |
| --- | --- | --- |
| 72a | RF Receiver | Receive cellular phone signals (1800 MHz and 1900 MHz bands) |
| 72b | RF Transmitter | Transmit signals to base station |
| 72c | RF Receiver | Receive CB radio signals (26.96 MHz-27.41 MHz) |
| 72d | Application Specific (illustrative RF Receiver or Transmitter) | Receive/Transmit RF Signals on various bands (e.g. RF commercial 2.4 GHz and 5.8 GHz bands, cellular phone 800 MHz and 900 MHz bands) |

As shown in FIGS. 3 and 5, the housing 20 of the electronic projectile 12 may include a number of surveillance devices 74 in addition to the RF detector 60. Such surveillance devices 74 may include a camera 74a and/or an audio receiver or microphone 74b. Illustratively, the camera 74a may be a video camera, a night vision camera, and/or an infrared (IR)

camera. The surveillance devices 74 are in communication with the processor 32 such that information may be processed and transmitted by the transceiver 66. More particularly, video and/or audio feeds may be streamed to the operator station 18 within the source signal 68. The video and/or audio feeds may also be stored within the volatile memory 35a or permanent memory 35b of the electronic projectile 12 for subsequent download and evaluation by advance teams prior to others entering the monitored area 30. As noted herein, only authorized nodes will be able to receive the source signal 68 through the use of security elements, such as encryption, filtering, and digital certificates.

With further reference to FIGS. 3 and 5, the electronic projectile 12 may further include one or more responders 76 controlled by the processor 32. In one illustrative embodiment, the responder comprises a destructive or anti-tamper device 76a, illustratively an incendiary device or an explosive, that may be detonated by the processor 32 in response to a predefined stimuli or trigger event. For example, if the location detector 40 senses an uncontrolled descent of the electronic projectile 12, the processor 32 may detonate the destructive device 76a to prevent unauthorized access to the components of the electronic projectile 12.

In a further illustrative embodiment, the responder 76 comprises an RF jamming device 76b configured to disrupt RF communications at a certain frequency within the monitored area 30. More particularly, the RF jamming device 76b may comprise an RF transmitter coupled to the processor 32 and tuned to the same frequency as the RF signal source 31 of interest and with the same type of modulation to interfere with, suppress, or disrupt any signal 62 at the RF signal source 31. In one illustrative embodiment, antennae 72d may be used to jam frequencies or send corrupt data. Illustratively, scrambled signals or irregularities in the modulation may be used to interfere with or jam signals from a specific frequency (for example jamming a 2.4 GHz signal coming from a transmitter by sending corrupted data on the same frequency to confuse the associated receiver). Illustratively, the RF jamming device 76b may be directed to certain cellular phones with ESIDs or ESNs previously identified by the processor 32. In other embodiments, identification of certain suspect ESIDs or ESNs themselves may be the trigger event causing activation of the responder 76 by the processor 32.

Figure 7:
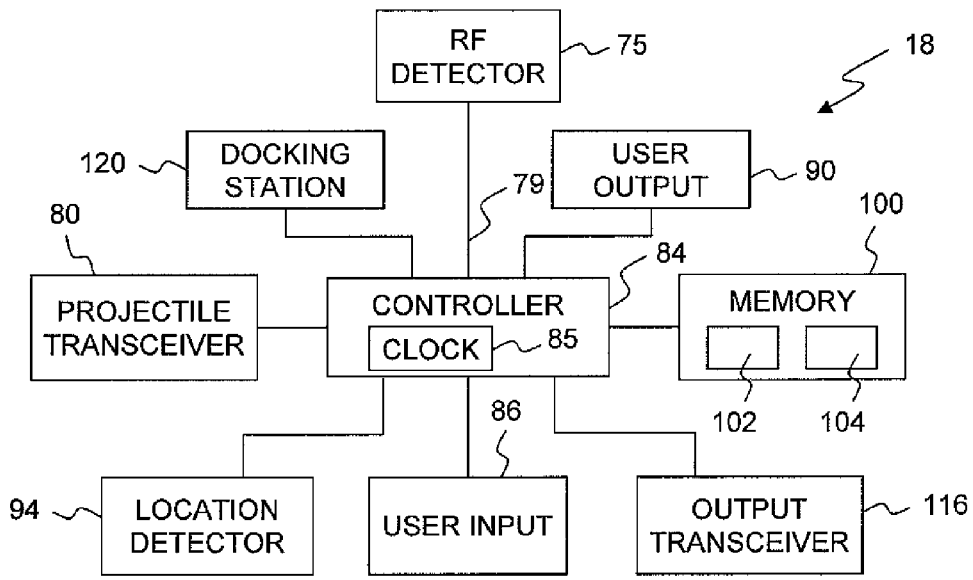
FIG. 7 is a block diagram showing interaction of various illustrative elements with the controller of the base station of FIG. 6.

Referring now to FIGS. 6 and 7, the operator station 18 illustratively includes an RF detector 75 including an antenna 77 configured to detect signals 62 transmitted by RF signal transmission sources 31. The RF detector 75 may function in a manner similar to the RF detector 60 of the projectile 12. More particularly, the RF detector 75 provides detection signals 79 indicative of the detected signals 62 transmitted by the RF signal transmission sources 31, including frequency and signal identification data. The illustrative operator station 18 further includes a projectile transceiver 80 having an antenna 82 for providing communication with the electronic projectile 12. As such, the transceiver 80 is configured to receive the source signal 68 from the electronic projectile 12. Similarly, the transceiver 80 is configured to transmit a control signal 81 to the electronic projectile 12. It should be appreciated that the frequency used for transmitting signals 68 and 81 between the projectile 12 and the operator station 18 should be different from the frequencies monitored by RF detectors 60 and 75 or jammed by the jamming device 76b.

A controller 84 is operably coupled to the RF detector 75 and to the transceiver 80. More particularly, the controller 84 processes information or data received from within the detection signal 79 from the RF detector 75 and the source signal 68 as transmitted by the electronic projectile 12. The controller 84 illustratively includes a master clock 85. The controller 84 cooperates with the master clock 85 to timestamp and record duration of signals 62 detected by the RF detector 75.

A user input 86, such as a keyboard 88, and a user output 90, such as a display screen 92 are in communication with the controller 84. A location detector 94, illustratively a GPS receiver including an antenna 98, are coupled to the controller 84. As further detailed herein, since the controller 84 includes absolute location information of the electronic projectile 12 (from the location detector 40) and the operator station 18 (from the location detector 94), it can determine the distance separating the projectile 12 and the operator station 18. The controller 84 then compares the thumbprints for detected signal(s) 62, from data within detection signal 79 and source signal 68, to determine that the signal(s) 62 are from the same RF signal source 31. Once the signal(s) 62 have been identified, the location data of the projectile 12 and the operator station 18, together with the signal time stamps are used to calculate through triangulation the absolute location or coordinates of the RF transmission source 31 (FIG. 2).

The controller 84 may include a memory 100 storing operating software 102, such as data collection software configured to cause the controller 84 to aggregate data from and assign data points to various RF transmission sources 31. The information aggregated by the controller of the operator station 18 may be output in a variety of manners. In one illustrative embodiment, mapping software 104 may also be stored in the memory 100 and used to position the identified RF signal transmission sources on a graphic representation or map 106 (FIG. 8).

Figure 8:
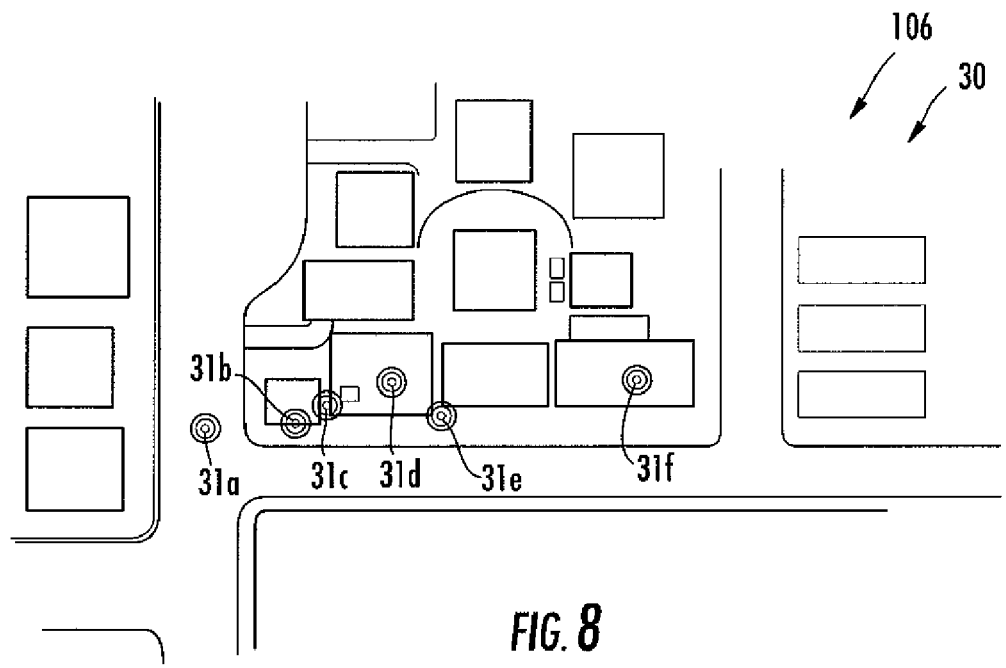
FIG. 8 is a top plan view of an illustrative embodiment radio frequency transmission map generated by the surveillance system of FIG. 1.

With reference to FIG. 8, the map 106 may be viewed by the user 15 on a user output 90, such as display screen 92 coupled to the controller 84. More particularly, the illustrative map 106 provides an aerial view of the monitored area 30 with the detected RF signal sources 31 identified by an indicia or symbol. Details of each signal source 31, such as transmission frequency, duration, and/or ESID or ESN, may be called up to the screen 92 by clicking on the symbol representing the signal source 31.

Figure 9:
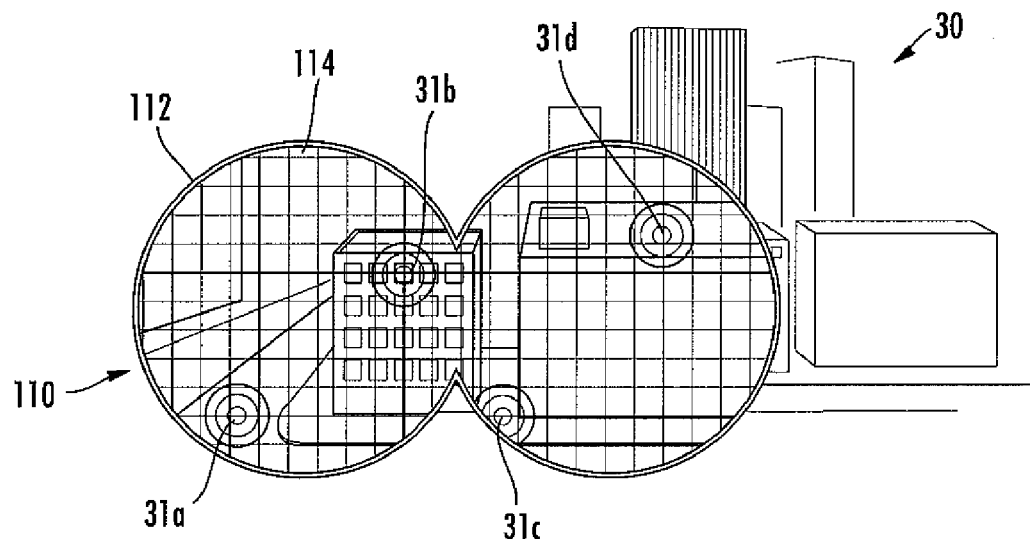
FIG. 9 is an illustrative view of a radio frequency transmission map displayed through the lenses of a pair of binoculars.

In a further illustrative embodiment, the user output 90 may include binoculars 110 (FIG. 9) including a display screen 112 having an electronic overlay 114 that may display location data of signal sources 31 received from the controller 84 via a wireless network signal transmitted by an output receiver, illustratively the transceiver 80. Illustratively, the binoculars 110 may comprise electronic distance ranging binoculars including an electronic compass and a distance ranging device (not shown). As noted above the binoculars 110 illustratively receives data processed by the operator station 18 via a wireless network signal. More particularly, the binoculars 110 include a processor in communication with the display screen 112 and a location detector, illustratively a GPS receiver (not shown). The processor of the binoculars 110 determines the location of the binoculars 110 and generates the image shown on the screen 112 through a variety of data sources. Such data sources may include the GPS receiver, the compass, the ranging device, and the operator station 18 to provide the overlay 114 on the screen 112.

As detailed herein, the projectile 12 and the operator station 18 are illustratively configured to detect RF signals 62. The controller 84 of the operator station 18 may be further configured to generate control signal 81 in response to a trigger or stimulus. More particularly, the controller 84 is looking for predefined trigger events. These predefined trigger events may be stored in memory 100 in a mission specific threat library. If a trigger match is found, the controller 84 causes the transceiver 80 to transmit the control signal 81 to the transceiver 66 of the electronic projectile 12. The processor 32 of the electronic projectile 12 may respond in a number of ways in response to the control signal 81 sent in response to the trigger event. For example, the processor 32 may take no action, or may activate responder 76 upon receiving proper instructions from the control signal 81. As detailed above, the responder 76 may include a number of active elements, including a destructive device and/or an RF jamming device. Alternatively, the processor 32 could cause activation of one or more of the surveillance devices 74 (such as camera 74*a* and/or audio receiver or microphone 74*b*) and/or an alarm.

The operator station 18 further includes a docking station 120 operably coupled to the controller 84. The docking station 120 illustratively includes a base 122 supporting a cylindrical housing or receiver 124 for receiving the electronic projectile 12. The receiver 124 includes electrical connectors 126, illustratively annular contact rings, for contacting mating electrical contacts or connectors 128 supported by the side wall 22 of the projectile 12. In one illustrative embodiment, four separate connectors are provided for mating with the projectile 12, in a similar fashion as a universal serial bus (USB). Illustratively, two of the connectors may be used for data communication with the processor 32, and the remaining two connectors may be used for charging the battery 34. A printed circuit board 130 is supported by the base 122 and couples the connectors 126 with the controller 84.

The operator station 18 is configured to negotiate with the projectile 12. Cryptographic keys are used to make sure the operator station 18 is valid and that the projectile 12 is valid. In other words, the operator station 18 and the projectile 12 may communicate only if their respective cryptographic keys are valid. Encryption may be used to encrypt data at rest when the projectile 12 is not being used.

The operator station 18 may communicate with the projectile 12 to facilitate a variety of services. For example, the operator station 18 may download audio and video stored in the projectile 12. The operator station 18 may also probe the projectile's memory 35 to determine if trigger events or stimuli have been discovered while the projectile 12 was operating in a "scarecrow" mode. The scarecrow mode is defined when the operator station 18 directs the projectile 12 to move over a geographic area and record audio, video, and/or RF signals. If the projectile 12 loses communication with the operator station 18, its function will not be affected. When the scarecrow mode is enabled, the projectile's processor 32 is instructed to deploy the destructive device 76*a* if a detected altitude is too low or if the location detector 40 detects that the projectile 12 is outside of its operational range.

Figure 10:
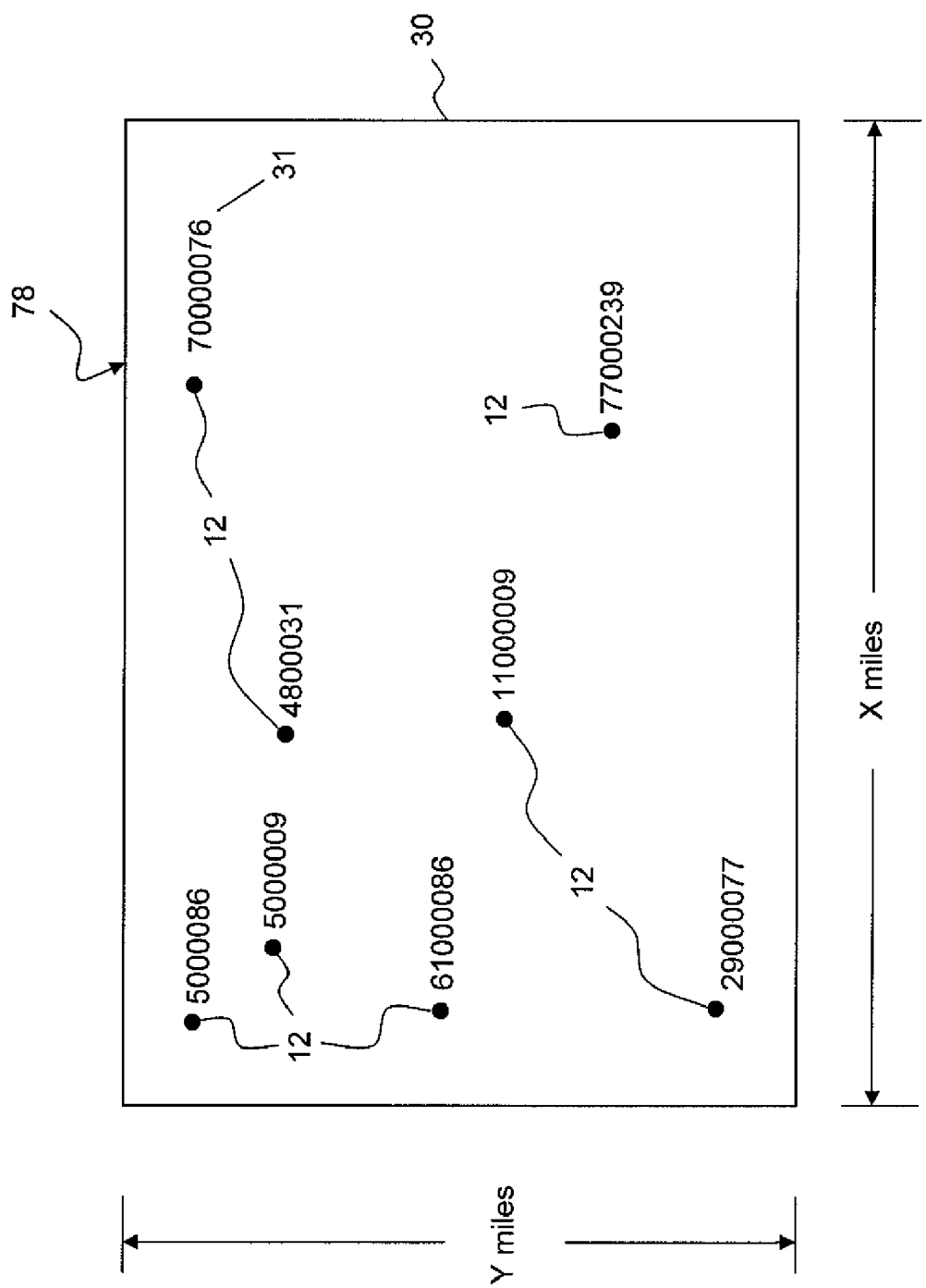
FIG. 10 is a diagrammatic representation of a geographic area under surveillance by a plurality of surveillance systems.

With reference to FIG. 10, multiple electronic projectiles 12 may be deployed to expand the effective monitored area 30 and create a coverage net 78. The coverage net 78 may be used to not only expand the monitored area 30, but may also be used to facilitate communication between multiple electronic projectiles 12 thereby providing relay communications in geographically challenging environments (e.g., mountains, tall buildings, etc.).

A plurality of different electronic projectiles 12 are shown in FIG. 10 to provide coverage net 78 over expanded monitored area 30 of approximately X miles by Y miles. The monitored area 30 may be expanded or contracted by deploying more or fewer electronic projectiles 12, respectively. Each operator station 18 has a unique identification number assigned to it. Similarly, each electronic projectile 12 has a unique identification number assigned to it and stored within its memory 35*b*. For example, the nineteenth projectile 12 launched from the operator station 18 identified as unit fifty is identified as projectile number 5000019, while the eighty-sixth projectile 12 launched from the same operator station 18 is identified as projectile number 5000086. Similarly, the two-hundred thirty-ninth projectile 12 launched from operator station number seventy-seven is identified as 77000239.

Figure 11:
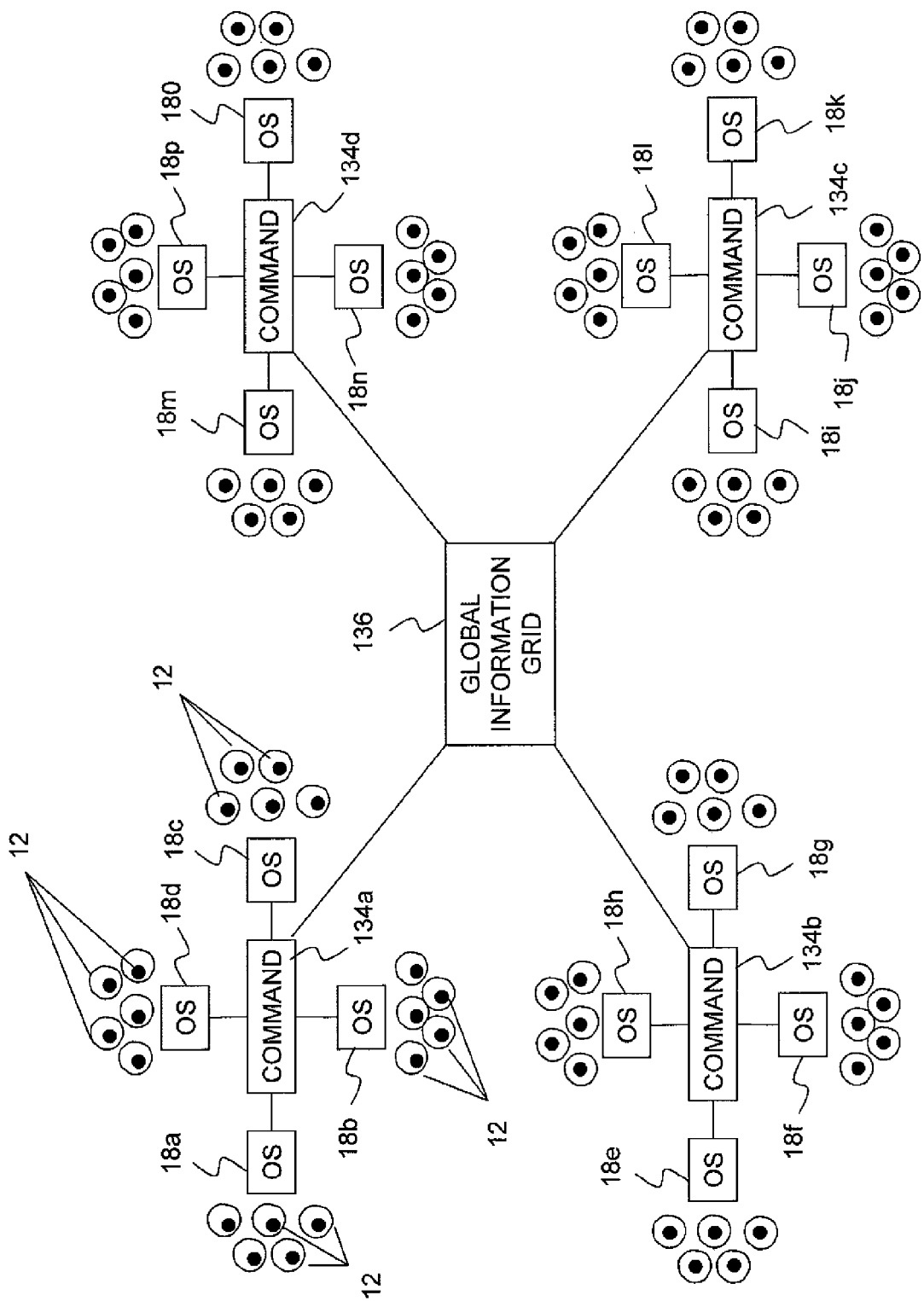
FIG. 11 is a diagrammatic view showing integration of the surveillance system of FIG. 1 with command nodes and a global information grid.

With reference to FIG. 11, the controller 84 may also include communication software 108 to facilitate communication between the operator station 18 and one or more electronic projectiles 12 and/or one or more central command stations 134. More particularly, the controller 84 of each operator station 18 may send and receive data to and from one of the command stations 134*a*, 134*b*, 134*c*, 134*d*. The command stations 134*a*, 134*b*, 134*c*, 134*d* may each be in active communication with a network 136, such as the global information grid (GIG) or worldwide web, through output transceiver, illustratively a two-way tactile radio 116. More particularly, the tactical radio 116 may be used for communicating with a C2 (Command and Control) platform, a C4I (Command, Control, Communications, Computers, and Intelligence) platform, or some other secure network 136 to upload and download information for intelligence gathering and/or sharing.

Figure 12:
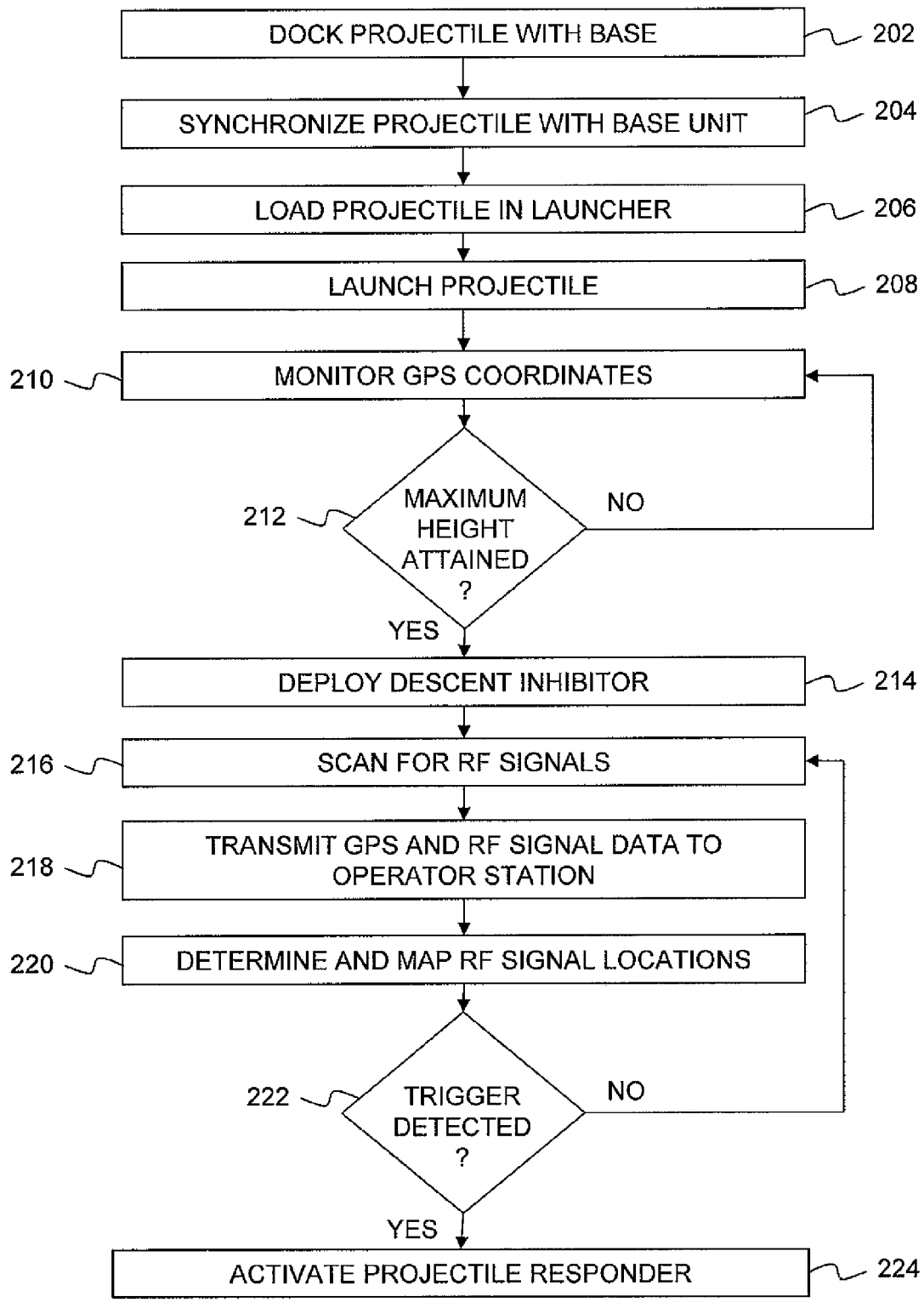
FIG. 12 is a flow chart of an illustrative method of operation of the surveillance system of FIG. 1.

With reference to FIG. 12, during operation of the surveillance system 10, a user 15 initially docks the electronic projectile 12 with the docking station 120 of the operator station 18, as shown in block 202. More particularly, the housing of the electronic projectile 12 is received within the receiver of the docking station 120 such that the electrical connectors 126 and 128 provide communication between the processor 32 of the projectile 12 and the controller 84 of the operator station 18. At block 204, the projectile 12 is synchronized with the operator station 18. For example, software and mission specific data (e.g. audio/video download, projectile memory download, cryptographic key exchange, firmware update, threat library, control data, etc.) is uploaded from the operator station 18 to the memory 35*a*, 35*b* of the projectile 12. Data may also be downloaded from the memory 35*a*, 35*b* of the projectile 12 to the operator station 18, for example, at the end of a mission. Such downloaded data may be used to create new or update existing threat libraries.

During this synchronization step, time is synchronized between the clock 33 of the projectile 12 and the master clock 85 of the operator station 18. More particularly, the processor 32 of the projectile 12 and the controller 84 of the operator station 18 determine the difference in time between the clocks 33 and 85 and assign this time difference value a variable in the memory 100 of the operator station 18, based upon the assigned projectile 12 (for example, projectile serial number in case the operator station 18 is monitoring multiple projectiles 12). Synchronizing or accounting for time differentials between the clocks 33 and 85 of the projectile 12 and the operator station 18, permits the respective processor 32 and controller 84 to determine how long a specific signal 62 takes to reach each location. This information is needed to calculate and triangulate distances to the transmission source based on signal communication times, and thereby determine the transmission source 31 location.

Next, the projectile 12 is undocked from the operator station 18 and loaded into the projectile launcher 14 at block 206. The user 15 at block 208 then launches the electronic projectile 12 from the launcher 14. The electronic projectile 12 travels along trajectory 28 away from the launcher 14. At block 210, the location detector 40 monitors GPS coordinates. Upon reaching maximum elevation 58 as detected by the location detector 40 and determined by processor 32 at block 212, the processor 32 deploys the descent inhibitor 50 at block 214. More particularly, the processor 32 opens the control valve 56 thereby filling the balloon 52 with gas from the gas supply 54. At this point, the electronic projectile 12 hovers above the geographic area 30 to be monitored.

The radio frequency detector 60 of the electronic projectile 12 scans the area for RF signal sources 31 at block 216. Upon detecting RF signals, the processor 32 uses the clock 33 to timestamp the signal 62 and record signal duration. The processor 32 also may record the signal 62 thumbprint (unique identification). Finally, the processor 32 attaches the location determined by the location detector 40 (illustratively GPS coordinates) of the projectile 12 at the time the signal 62 was received. As detailed above, additional monitoring may be conducted by other surveillance devices, such as a video camera and/or an audio receiver, which provides video and/or audio data to the processor 32. The source signal 68, including data on absolute location of projectile 12, timestamp of transmitted RF signals, frequency of RF signal sources 31, and duration of transmitted RF signals, is then transmitted at block 218 by the transceiver 66 to the controller 84 of the operator station 18. In instances where cell phone signal sources 31 are identified, cell phone identification numbers (ESID or ESN) may also be included in the source signal 68. Additional surveillance data, such as video and/or audio data may also be transmitted in source signal 68.

The transceiver 80 of the operator station 18 receives the source signal 68 from projectile 12. The controller 84 utilizes the security devices, such as encryption digital certificates, and/or filtering, to verify the authenticity of the source signal 68. The operator station 18 receives the same signal 62 from the signal source 31 and records the same data as the projectile 12, including receipt time of the signal 62 and signal duration. The absolute locations of both the projectile 12 and the operator station 18 are then used to determine the distance separating the projectile 12 and the operator station 18. The controller 84 of the operator station 18 compares the thumbprint from the signal(s) 62 detected at both the projectile 12 and the operator station 18, and determines whether the signal(s) 62 is the same. Once the signal(s) has been determined to be the same, the location coordinates and time delays from the projectile 12 and the operator station 18 are computed by the controller 84 to give a triangulation position of, and intercept vector to, the signal source 31. In other words, the controller 84 triangulates the signal source 31 and then assigns it a data point and a geospatial location at block 220.

Once data points are collected for all of the known signal sources 31, the controller 84 of the operator station 18 may relay the data back to a command unit or to the global information grid for command decision and/or information gathering. Data may also be relayed to various user outputs, such as the electronic binoculars 110 or display screen 92, for mapping relative to the location of the operator station 18. The binoculars 110 may be used to find the target visually, where it can be flagged as threat or benign from visual prompts on overlay 114 of the binoculars 110. The user 15 may visually identify targets on the overlay 114, whereby the user 15, or others having access to the data through operator station 18, command station, or global information grid, may scroll through targets and identify as friend or foe.

As shown at block 222, upon detecting an appropriate stimulus or trigger event, the controller 84 will match the detected trigger event to a corresponding predefined trigger event stored in the threat library. At this point the controller 84 will caused the transceiver 80 to transmit a signal back to the processor 32 of the electronic projectile 12 to activate at least one responder 76. The stimulus or trigger event may illustratively comprise any one of a frequency location, a frequency movement, and a frequency duration. The stimulus or trigger event may also comprise a particular cellular phone of interest as identified through its ESID or ESN. In one illustrative embodiment, the responder 76 comprises a jamming signal which is transmitted at block 224 by the electronic projectile 12. In a further illustrative embodiment, the responder 76 comprises an explosive which is detonated in response to the signal from the operator station 18.

As may be appreciated, the illustrative radio frequency transmission surveillance system 10 as detailed herein may be used in a wide variety of environments for numerous different purposes. In military applications, the system 10 may provide RF mapping of hostile areas in order to locate enemy combatants and/or improvised explosive devices (IEDs) with RF triggers. The system 10 may also provide video and audio surveillance or reconnaissance for military, law enforcement, and/or search and rescue users. As detailed above, the system 10 may also provide for smart RF jamming in order to prevent undesirable RF communications. In communications applications, the plurality of projectiles 12 may be useful in providing communication relays in difficult environments, such as mountainous regions. The system 10 may be integrated into a global information grid thereby providing the mapping of RF signals, including cellular phone ESIDs. In all applications, live encrypted data feeds may be provided from the projectile 12 to various operator stations 18 on the ground.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. An electronic projectile comprising:
a housing;
a processor received within the housing;
a power source operably coupled to the processor;
a location detector operably coupled to the processor, the location detector configured to detect the location of the housing and provide a location signal including location data of the housing to the processor;
a descent inhibitor adapted to maintain an altitude or position relative to a ground reference for a predetermined period operably coupled to the processor, the descent inhibitor configured to be stored in the housing during a first mode of operation and to be deployed during a second mode of operation, the processor controlling deployment of the descent inhibitor;
a radio frequency detector operably coupled to the processor, the radio frequency detector configured to scan and detect a radio frequency transmission signal based on signals from said processor and provide a detection signal including data on the radio frequency transmission signal to the processor, wherein said processor further stores a plurality of time stamp data associated with a respective plurality of said detected radio frequency transmission signal;
a transmitter operably coupled to the processor, the processor configured to cause the transmitter to send a plurality of source signals to an operator station, the source signal including the location data of the housing, at least one said time stamp associated with said location data, and the data on the radio frequency transmission signal, wherein said data on the radio frequency signal comprises at least one signal characteristic;

a receiver operably coupled to the processor and configured to receive a control signal from the operator station, the control signal based upon a trigger determined by the operator station, and the processor activating a responder in response to the control signal;

a plurality of antennas operably coupled to the radio frequency detector, each of the plurality of antennas tuned to a different frequency range; and wherein said processor, said transmitter, and said receiver send a signal to query a plurality of communication devices within a predetermined range of said projectile, wherein said query triggers said communication devices to transmit a unique identification data code associated with each of said communication devices;

wherein said processor appends said unique identification data code to said queried signal data.

2. The electronic projectile of claim 1, further comprising a propellant configured to drive the housing in motion.

3. The electronic projectile of claim 1, further comprising a shock absorber operably coupled to the processor.

4. The electronic projectile of claim 1, further comprising a data port supported by the housing and in communication with the processor, the data port configured to electrically couple to a connector supported by a docking station of the operator station.

5. The electronic projectile of claim 1, further comprising at least one of a camera configured to transmit an image to the processor, and an audio receiver configured to transmit an audio signal to the processor.

6. The electronic projectile of claim 1, further comprising a destructive member received within the housing, detonation of the destructive member being controlled by the processor.

7. The electronic projectile of claim 6, wherein the destructive member comprises at least one of an explosive and an incendiary device.

8. The electronic projectile of claim 1, wherein the descent inhibitor comprises one of a balloon or a parachute deployed by the processor when said processor determines a predetermined elevation is detected based on at least one said location data.

9. The electronic projectile of claim 8, wherein the predetermined elevation is the apex of the trajectory of the projectile.

10. The electronic projectile of claim 1, wherein the location detector includes a global positioning satellite receiver and antenna.

11. The electronic projectile of claim 1, wherein the transmitter is defined by a transceiver received within the housing.

* * * * *